2 Sheets--Sheet 1.

A. DURINI.
Watch-Gear Cutting-Machines.

No. 144,266. Patented Nov. 4, 1873.

Witnesses.

Inventor.

A. DURINI.
Watch-Gear Cutting-Machines.

No. 144,266. Patented Nov. 4, 1873.

UNITED STATES PATENT OFFICE.

AGOSTINO DURINI, OF NEW YORK, N. Y., ASSIGNOR TO HIMSELF, GUESEPPI ROSSI, AND FRANK E. MILLER, OF SAME PLACE.

IMPROVEMENT IN WATCH-GEAR-CUTTING MACHINES.

Specification forming part of Letters Patent No. 144,266, dated November 4, 1873; application filed July 7, 1873.

*To all whom it may concern:*

Be it known that I, AGOSTINO DURINI, of the city of New York, N. Y., have invented an Improvement in Machinery for Finishing and Polishing Gears, reference being had to the accompanying drawings forming part hereof.

Figure 1:
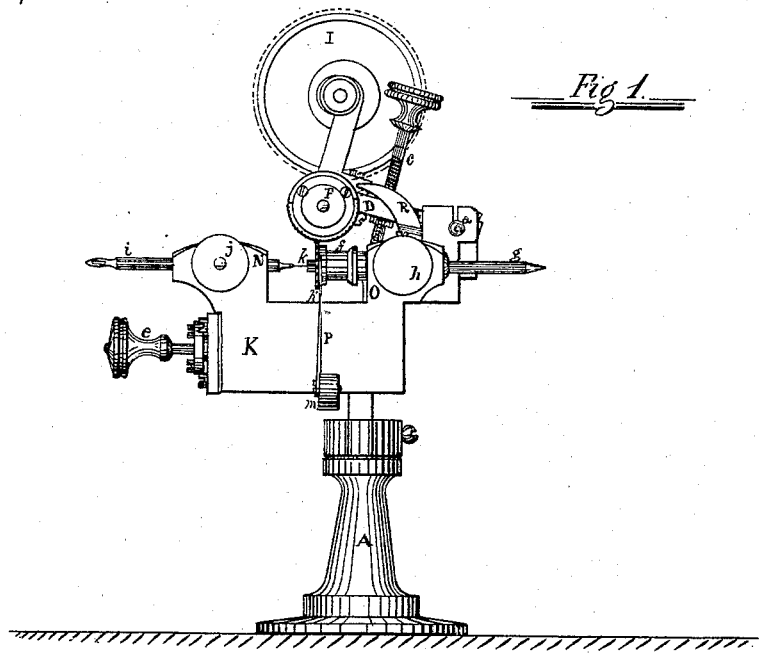
Figure 2:
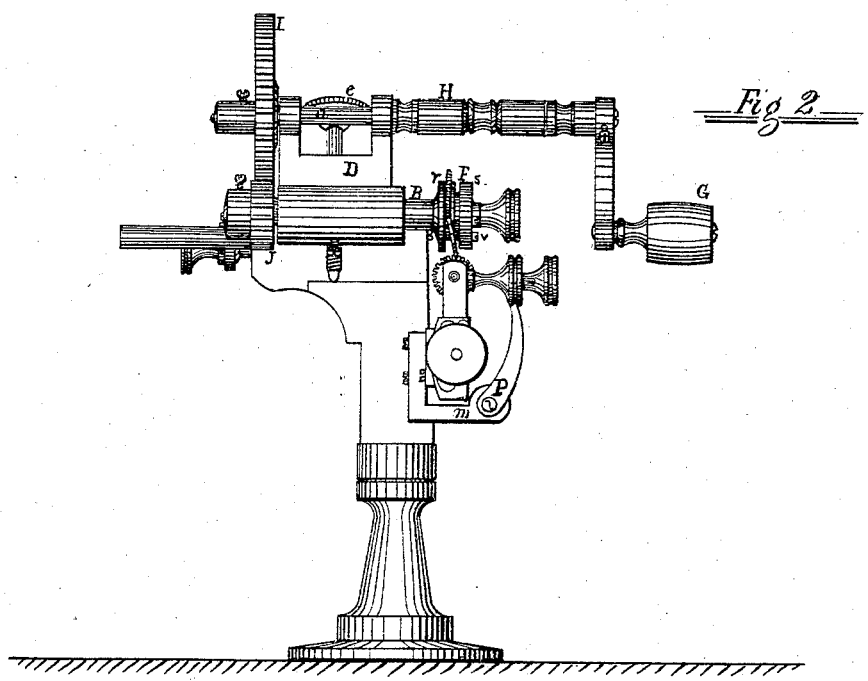
Figure 1:
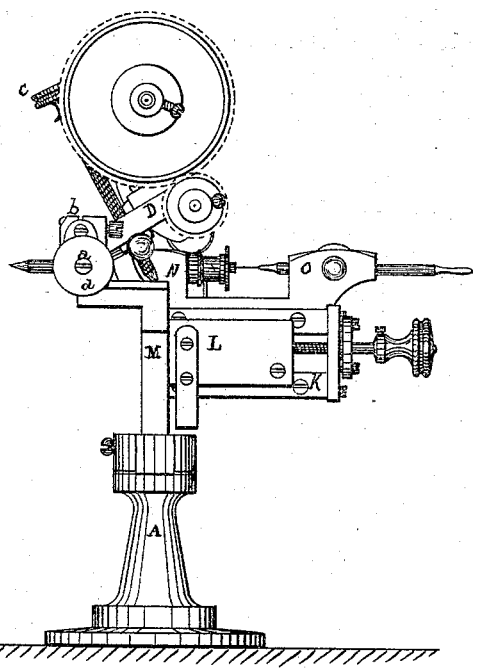
Figure 2:
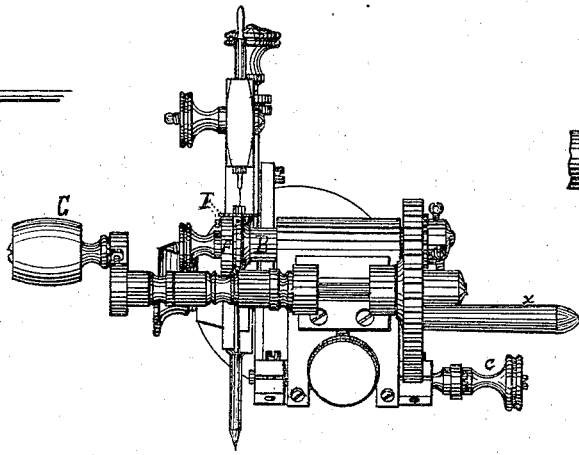
Figure 3:
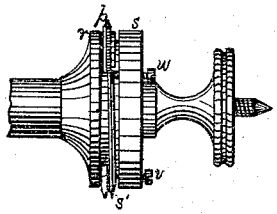

Figure 1, Sheet 1, is an end elevation of a machine embodying my invention. Fig. 2, same sheet, is a front elevation of the same. Fig. 1, Sheet 2, is also an end elevation of the said machine, the cutter-head being, however, swung up out of engagement with the gear to be operated upon, and the latter being also out of adjustment with the cutter. Fig. 2, same sheet, is a plan of the same. Fig. 3, same sheet, is an enlarged view of the cutter-head detached, showing more plainly than can be done in the drawing of the full machine the cutter and the cam combined with it, by which the gear is revolved in the act of finishing or polishing the teeth.

My invention relates to combining, in a gear finishing or polishing machine, a rotary segmental cutter or polisher with a segmental cam, whereby the gear being operated upon, after the cutter has traversed the space between two teeth, is revolved so that it (the cutter) shall at the next revolution traverse the next succeeding space. It relates, also, to combining, with the above devices and certain adjustable parts of the machine hereinafter particularly described, two swinging gages, whereby the gear operated upon may be laterally and vertically adjusted to the cutter or polisher. It relates, also, to mounting the cutter or polisher, with the mechanism for rotating the same, upon an adjustable swinging carriage, whereby the said cutter may be adjusted vertically or laterally.

The machine embodying my improvement is designed especially for the use of watch-makers and others who desire to finish small gear-wheels with great accuracy.

A is the standard or table, upon which the several working parts are mounted. B is a spindle, having a long bearing in the journal-box C on the end of the swinging carriage D, that is pivoted at the opposite end on the rod $a$ fixed in the arms $b$. F is the cutter-head, fixed to the end of the spindle B, which is driven by hand by the crank G, the shaft H, and gears I and J. The cutter-head, with the entire mechanism mounted on the carriage D, with the said carriage itself, is adjustable vertically by means of the screw $c$, and laterally upon the rod $a$ by means of the screw $d$. K is an adjustable carriage, which is carried on a dovetailed way that projects from the inner face of the arm L connected to the standard M. This carriage is adjustable in the direction of the said arm L by means of the screw $e$. N and O are two arms connected with the carriage K, upon one of which is a chuck, $f$, for holding the gear $h'$ to be operated upon, a spindle, $g$, passing through the arm and chuck, the point of which serves to control the gear, if held on a shaft, the spindle being held in place by the set-screw $h$. In the other arm is a second spindle, $i$, held by the set-screw $j$, which receives and holds the opposite end of the gear-shaft $k$, the said shaft with its gear being permitted to revolve in the points of these spindles. P is a gage, pivoted at $l$ on the fixed arm $m$, its upper point being in the vertical plane passing through the center of the cutter-head F and shaft B, whereby the gear may be centered underneath the cutter. R is a second gage, pivoted on the arm O, its upper point being in the vertical plane that passes through the center of the spindle $g$ and $i$, and, consequently, also the center of the gear $h'$ that is being operated upon, whereby the cutter may be adjusted directly over the center of the said gear in the proper position for operation. The cutter or polishing-instrument $b$, Fig. 3, is formed of a segment of a steel ring, having a file-edge, held between the two plates $r$ and $s$ of the cutter-head; the remaining portion of the circle between the opposite limbs of the segmental cutter being occupied by a thin, smooth, steel, segmental cam, $s'$, set in position diagonally, one end coinciding with the adjacent end of the cutter, the other end being out of coincidence with the opposite limb of the cutter by just the distance between the centers of two adjacent teeth of the gear that is being operated upon, the inclination of said cam $s'$ being adjustable to different sizes of teeth and spaces by means of the set-screws $u$ and $v$. $x$ is a shaft or handle fixed to the carriage D, upon which the finger may be placed to hold the carriage down while the machine is operated.

It is obvious that when the cutter and gear are so adjusted that the former, upon being revolved, will traverse the space between any two teeth, as the cutter leaves; the cam, following immediately, will enter the next succeeding space, and will revolve the gear on its axis just one tooth, so that the cutter at the next revolution will traverse such next space, so that the machine is operated, when all the parts are adjusted, by simply a continuous turning of the crank G, the gear being thereby automatically revolved with an intermittent motion, whereby the cutter is caused to traverse successively all the spaces between the teeth of the gear. By this means, the cutter being properly shaped and constructed, gears, after being struck out with dies or otherwise cut, may be trued and finished up with great exactness.

In place of the steel file-edged cutter, a polishing-instrument made of any suitable substance may be employed, on which emery or other polishing material may be used, to give a smooth surface to the teeth.

What I claim as my invention, and desire to secure by Letters Patent, is—

1. The combination, with the swinging adjustable carriage D and the several working parts mounted upon and carried by it, of the adjustable carriage K and the several working parts mounted upon and carried by it, as and for the purposes specified.

2. The combination of the swinging gage P with the cutter-head F and its attachments, and the chuck $f$, as and for the purposes specified.

3. The combination of the swinging gage R with the chuck $f$ and cutter-head F and its attachments.

AGOSTINO DURINI.

Witnesses:
  Z. S. CLARK,
  E. ROSSI.